United States Patent
Shen et al.

(10) Patent No.: US 11,397,487 B2
(45) Date of Patent: Jul. 26, 2022

(54) RE-CONFIGURABLE RECEIVER CHANNELS FOR A SENSING DEVICE

(71) Applicant: SYNAPTICS INCORPORATED, San Jose, CA (US)

(72) Inventors: Guozhong Shen, San Jose, CA (US); Ozan Ersan Erdogan, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 107 days.

(21) Appl. No.: 16/821,599

(22) Filed: Mar. 17, 2020

(65) Prior Publication Data

US 2021/0294449 A1 Sep. 23, 2021

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05)

(58) Field of Classification Search
CPC .............................. G06F 3/0416; G06F 3/0446
See application file for complete search history.

(56) References Cited

U.S. PATENT DOCUMENTS

| | | | |
|---|---|---|---|
| 4,974,236 A * | 11/1990 | Gurcan | H03C 1/60 375/301 |
| 5,648,642 A * | 7/1997 | Miller | G06F 3/04166 341/33 |
| 5,790,106 A * | 8/1998 | Hirano | G06F 3/0446 345/173 |
| 5,880,411 A * | 3/1999 | Gillespie | G06V 40/20 345/157 |
| 8,625,564 B2 * | 1/2014 | Kawasaki | H04M 1/72412 370/510 |
| 8,730,204 B2 * | 5/2014 | Washburn | G06F 3/0446 345/174 |
| 8,766,949 B2 | 7/2014 | Schwartz | |
| 9,389,742 B2 * | 7/2016 | Crandall | G06F 3/04162 |
| 10,203,809 B2 | 2/2019 | Sobel et al. | |
| 10,353,518 B2 * | 7/2019 | Petrovic | G06F 3/0418 |
| 10,928,944 B1 * | 2/2021 | Nohtomi | H03K 17/955 |
| 2012/0068966 A1 * | 3/2012 | Washburn | G06F 3/0418 345/174 |
| 2012/0217981 A1 * | 8/2012 | Erdogan | G06F 3/044 324/679 |

(Continued)

*Primary Examiner* — Benyam Ketema
(74) *Attorney, Agent, or Firm* — Leydig, Voit & Mayer, Ltd.

(57) ABSTRACT

A system and method for interference detection comprises coupling, in a first mode, an input of a first receiver channel with an input of a second receiver channel. In the first mode, the first receiver channel generates a first output signal by mixing a first portion of a combined resulting signal with a first mixing signal having a first phase. The combined resulting signal is simultaneously received from a first sensor electrode and a second sensor electrode. Further, in the first mode, the second receiver channel generates a second output signal by mixing a second portion of the combined resulting signal with a second mixing signal having a second phase orthogonal to the first phase. The first portion of the combined resulting signal differs from the second portion of the combined resulting signal.

20 Claims, 7 Drawing Sheets

(56) References Cited

U.S. PATENT DOCUMENTS

| | | | |
|---|---|---|---|
| 2013/0021294 A1* | 1/2013 | Maharyta | G06F 3/0446 345/174 |
| 2013/0162585 A1* | 6/2013 | Schwartz | G06F 3/0446 345/174 |
| 2013/0162586 A1* | 6/2013 | Erdogan | G06F 3/044 345/174 |
| 2015/0177868 A1* | 6/2015 | Morein | G06F 3/03545 345/174 |
| 2016/0179243 A1* | 6/2016 | Schwartz | G06F 3/0446 345/174 |
| 2017/0147141 A1* | 5/2017 | Khazeni | G06F 3/041662 |
| 2018/0107335 A1* | 4/2018 | Petrovic | G06F 3/0442 |
| 2018/0188845 A1* | 7/2018 | Bohannon | G06F 3/04166 |
| 2018/0314379 A1* | 11/2018 | Shen | G06V 40/1318 |
| 2018/0341364 A1 | 11/2018 | Sobel et al. | |
| 2021/0055824 A1* | 2/2021 | Shen | G06F 3/044 |

\* cited by examiner

RE-CONFIGURABLE RECEIVER CHANNELS FOR A SENSING DEVICE

BACKGROUND

Field

The disclosure herein is generally related to electronic devices, and more specifically, to operating sensing devices.

Description of the Related Art

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook desktop computers, automotive multimedia systems, or internet of things (IoT) devices. Proximity sensor devices may also be used in smaller computing systems, such as touch screens integrated in cellular phones.

SUMMARY

In one embodiment, a processing system comprises a first receiver channel, a second receiver channel, and a switching mechanism. In a first mode the first receiver channel is configured to generate a first output signal by mixing a first portion of a combined resulting signal with a first mixing signal having a first phase. The combined resulting signal includes a first resulting signal received from a first sensor electrode and a second resulting signal received from a second sensor electrode. In the first mode the second receiver channel is configured to generate a second output signal by mixing a second portion of the combined resulting signal with a second mixing signal having a second phase orthogonal to the first phase. The first portion of the combined resulting signal differs from the second portion of the combined resulting signal. The switching mechanism is coupled to an input of the first receiver channel and an input of the second receiver channel. The switching mechanism is configured to couple the input of the first receiver channel with the input of the second receiver channel in response to the first receiver channel and the second receiver channel being in the first mode.

In one embodiment, an input device comprises a plurality of sensor electrodes and a processing system. The plurality of sensor electrodes comprises a first sensor electrode and a second sensor electrode. The processing system is coupled to the plurality of sensor electrodes and comprises a first receiver channel, a second receiver channel, and a first switching mechanism. In a first mode the first receiver channel is configured to generate a first output signal by mixing a first portion of a combined resulting signal with a first mixing signal with a first phase. The combined resulting signal includes a first resulting signal received from the first sensor electrode and a second resulting signal received from the second sensor electrode. The second receiver channel is configured to generate, while in the first mode, a second output signal by mixing a second portion of the combined resulting signal with a second mixing signal having a second phase orthogonal to the first phase. The first portion of the combined resulting signal differs from the second portion of the combined resulting signal. The switching mechanism is coupled to an input of the first receiver channel and an input of the second receiver channel and is configured to couple the input of the first receiver channel with the input of the second receiver channel in response to the first receiver channel and the second receiver channel being in the first mode.

In one embodiment, a method comprises coupling an input of a first receiver channel with an input of a second receiver channel in a first mode. The method further comprises generating, by the first receiver channel and while in the first mode, a first output signal by mixing a first portion of a combined resulting signal with a first mixing signal having a first phase. The combined resulting signal includes a first resulting signal received from a first sensor electrode and a second resulting signal received from a second sensor electrode. Further, the method comprises generating, by the second receiver channel and while in the first mode, a second output signal by mixing a second portion of the combined resulting signal with a second mixing signal having a second phase orthogonal to the first phase. The first portion of the combined resulting signal differs from the second portion of the combined resulting signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
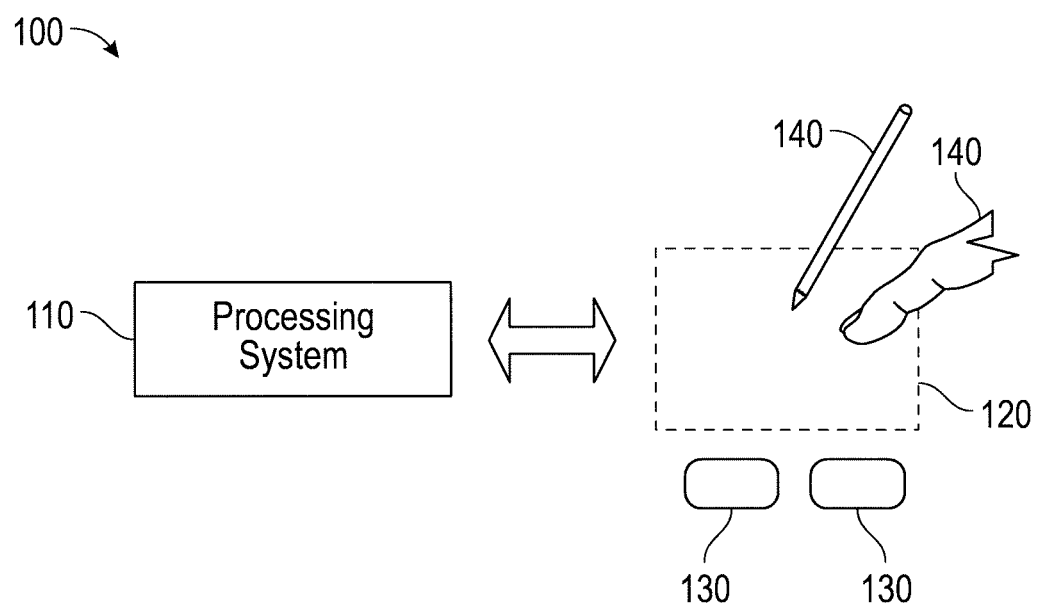
FIG. 1 is a schematic block diagram of an input device, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In many embodiments, input devices may utilize in-band and quadrature demodulation for interference detection. In-band and quadrature demodulation techniques for interference detection detect interference in phase with the sensing signal and interference that is ninety degrees out of phase with the sensing signal. In-band and quadrature demodulation may rely on a mapping of the sensor electrodes where in each group of M×N sensor electrodes, at least one sensor electrode is coupled to a receiver channel configured for in-band demodulation and at least one sensor electrode is coupled to a receiver channel configured for quadrature demodulation. However, an in-band and quadrature demodulation technique that relies on such a mapping may limit the applicability of an in-band and quadrature demodulation techniques. For example, if an input device does not support the relied upon mapping, in-band and quadrature demodulation techniques may not acquire necessary combination of resulting signals to be utilized to detect interference. As will be described in greater detail in the following description, by selectively coupling a receiver channel configured for in-band demodulation with a receiver channel configured for quadrature demodulation, such that each receiver channel is connected to a common set of sensor electrodes, in-band and quadrature demodulation techniques may be applied to an input device having any mapping of sensor electrodes.

An example input device 100 as shown in FIG. 1 in accordance with embodiments of the disclosure may be configured to provide input to an electronic system (not shown). As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Further, additional example electronic systems may include automotive multimedia centers (e.g., navigation devices, audio systems). In various embodiments, the electronic system may be an internet of things (IoT) device. For example, the IoT device may be an automated, or smart, home device (e.g., consumer appliances, security systems, and/or cameras), or manufacturing devices, among others.

In one or more embodiments, the electronic system could be a host or a slave to the input device. Further, in various embodiments, the electronic system may also be referred to as electronic device.

The input device 100 can be implemented as a physical part of the electronic system, or can be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples of wired or wireless interconnections include $I^2C$, SPI, PS/2, Universal Serial Bus (USB), Bluetooth, radio frequency, and infrared.

In FIG. 1, the input device 100 is shown as a proximity sensor device configured to sense input provided by one or more input objects 140 in a sensing region 120. Example input objects 140 include fingers and styli as shown in FIG. 1. An exemplary proximity sensor device may be a touchpad, a touch screen, or a touch sensor device, among others.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, sensing input in the sensing region 120 may comprise: no contact with any surfaces of the input device 100; contact with an input surface, e.g., a touch surface, of the input device 100; contact with an input surface of the input device 100 coupled with some amount of applied force or pressure; and/or a combination of two or more of the above. In various embodiments, input surfaces may be provided by surfaces of casings within which the sensor electrodes (also referred to herein as sensing electrodes) reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material. Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated an input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, an automotive multimedia system, or an IoT device and the processing system 110 may comprise circuits and firmware that are part of a main processor (e.g., a mobile device application processor or any other central processing unit) of the phone, automotive multimedia system, or IoT device. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for finite impulse response (FIR) digital filtering or infinite impulse response (IIR) filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. Additionally, the baseline may be compensated for using digital or analog means. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., indium tin oxide (ITO), metal mesh, etc.) overlaying the display screen and provide a touch screen interface for the associated electronic system. The display panel may be any type of dynamic display capable of displaying a visual interface to a user, and may include any type of light emitting diode (LED), organic light emitting diode (OLED), cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

Figure 2:
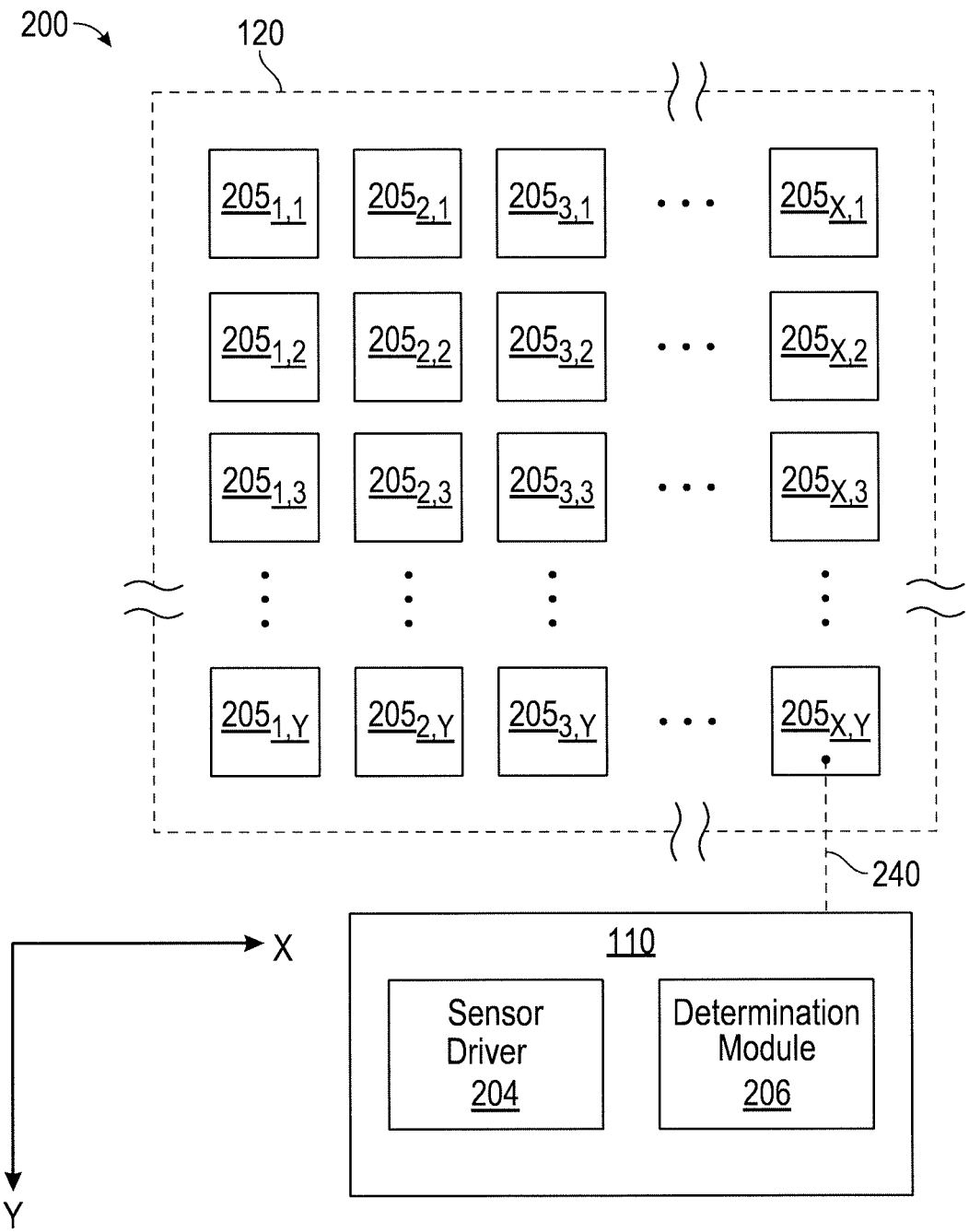
FIG. 2 illustrates an example input device, according to one or more embodiments.

FIG. 2 embodies an example of the input device 100 of FIG. 1, and illustrates sensor electrodes 205 and the processing system 110. The sensor electrodes 205 are configured to sense one or more input objects (e.g., the input object 140) in the sensing region 120. Each sensor electrode 205 may include one of more of the sensing elements described above. For clarity of illustration and description, FIG. 2 presents the regions of the sensor electrodes 205 in a pattern of simple rectangles and does not show various other components connected to or within the sensor electrodes 205.

The exemplary pattern of the sensor electrodes 205 comprises an array of sensor electrodes 205$x,y$ (referred collectively as sensor electrodes 205) arranged in X columns and Y rows in a common plane, wherein X and Y are positive integers, although one of X and Y may be zero. It is contemplated that the pattern of sensor electrodes 205 may comprise a plurality of sensor electrodes 205 having other configurations, such as polar arrays, repeating patterns, non-repeating patterns, non-uniform arrays a single row or column, or other suitable arrangement. Further, as will be discussed in more detail below, the sensor electrodes 205 may be any shape such as circular, rectangular, diamond, star, square, nonconvex, convex, nonconcave concave, etc. As shown here, the sensor electrodes 205 are coupled to the processing system 110 and utilized to determine the presence (or lack thereof) and positional information of an input object, e.g., the input object 140, in the sensing region 120.

The sensor electrodes 205 are ohmically isolated from each other. That is, one or more insulators separate the sensor electrodes and prevent them from electrically shorting to each other.

As illustrated in FIG. 2, the processing system 110 includes a sensor driver 204 and a determination module 206 and the processing system 110 is coupled to the sensor electrodes 205 via the traces 240. The processing system 110 is configured to operate the sensor electrodes 205 for capacitive sensing to detect the presence of one or more input objects (e.g., the input object 140).

In one or more embodiments, the sensor driver 204 operates one or more sensor electrode 205 for absolute capacitive sensing to detect the presence of the input object 140. For example, the sensor driver 204 is configured to drive the sensor electrodes 205 using traces 240 with an absolute capacitive sensing signal and acquire resulting signals from the driven sensor electrodes 205. In such an embodiment, the resulting signals comprise effects corresponding to the absolute capacitive sensing signal. The absolute capacitive sensing signal may be varying voltage signal. For example, the absolute capacitive sensing signal may vary between two or more voltages. Additionally, the absolute capacitive sensing signal is periodic or aperiodic. Further, the absolute capacitive sensing signal may have one of a square waveform, a sinusoidal waveform, a trapezoidal waveform, or a triangular waveform, among others. The frequency of the absolute capacitive sensing signal may be in a range of about 100 kHz to about 1 MHz. However, in other embodiments, frequencies of less than 100 kHz or frequencies of greater than 1 MHz may be utilized. Further, the absolute sensing signal contains one or more sensing bursts in one or more sensing cycles. Each sensing bursts may include a transition from a first voltage to a second voltage and from the second voltage to the first voltage. However, in other embodiments, each sensing bursts may include transitions between more than two voltages.

In one or more embodiments, the sensor driver 204 is configured to operate the sensor electrodes 205 for absolute capacitive sensing by driving two or more of the sensor electrodes 205 with an absolute capacitive sensing signal at the same time. In such embodiments, a resulting signal may be acquired from each of the driven sensor electrodes 205 simultaneously. In one embodiment, the sensor driver 204 drives a first one or more of the sensor electrodes 205 with an absolute capacitive sensing signal during a first period and a second one or more of the sensor electrodes with an absolute capacitive sensing signal during a second period. The first period and the second period may be at least partially overlapping or non-overlapping. In another embodiment, the sensor driver 204 drives each of the sensor electrodes 205 simultaneously during the same period.

In another embodiment, the sensor driver 204 operates the sensor electrodes 205 for transcapacitive sensing to detect the presence of the input object 140. That is, the sensor driver 204 may drive a first one or more sensor electrode 205 with a transcapacitive sensing signal and receive resulting signals using a second one or more sensor electrode 205. The resulting signals comprising effects corresponding to the transcapacitive sensing signal. The sensor electrodes that are driven with the transcapacitive sensing signal are modulated relative to the sensor electrodes that receive the resulting signals. In one embodiment, both the sensor electrodes that are driven with the transcapacitive sensing signal and the sensor electrodes that receive the resulting signals are modulated, such that the sensor electrodes are modulate relative to each other. In another embodiment, the receiver electrodes are driven with a constant voltage signal while the sensor electrodes driven with the transcapacitive sensing signal are driven with transcapacitive sensing signal.

The transcapacitive sensing signal may be varying voltage signal. For example, the transcapacitive sensing signal may vary between two or more voltages. Additionally, the transcapacitive sensing signal is periodic or aperiodic. Further, the transcapacitive sensing signal may have one of a square waveform, a sinusoidal waveform, a trapezoidal waveform, or a triangular waveform, among others. The frequency of the transcapacitive sensing signal may be in a range of about 100 kHz to about 1 MHz. However, in other embodiments, frequencies of less than 100 kHz or frequencies of greater than 1 MHz may be utilized. Further, the transcapacitive sensing signal contains one or more sensing bursts in one or more sensing cycles. Each sensing bursts may include a transition from a first voltage to a second voltage and from the second voltage to the first voltage. In embodiments employing transcapacitive sensing signals having more than two voltages, each sensing burst may include more than two transitions. Further, the transcapacitive sensing signal may be the same or different from the absolute capacitive sensing signal.

In some embodiments, the sensor driver 204 operates the sensor electrodes 205 for transcapacitive sensing by driving the sensor electrodes 205 transcapacitive sensing signals on a one at a time basis. In such embodiments, the sensor driver 204 drives one sensor electrode 205 with a transcapacitive sensing signal at a time. Further, the other sensor electrodes 205 may be driven with a substantially constant voltage.

Alternatively, the sensor driver 204 operates the sensor electrodes 205 for transcapacitive sensing by driving multiple sensor electrodes 205 with transcapacitive sensing signals at the same time. In such an embodiment, the sensor electrodes 205 are driven with the transcapacitive sensing signals simultaneously. In one embodiment, two or more of the sensor electrodes 205 may be simultaneously driven with the same transcapacitive sensing signal. Driving two more of the sensor electrodes 205 with the same transcapacitive sensing signal effectively produces an effectively larger sensor electrode (e.g., ganging of sensor electrodes 205). In another embodiment, the sensor driver 204 may drive a first one or more of the sensor electrodes 205 with a first transcapacitive sensing signal and simultaneously drive a second one or more of the sensor electrodes with a second transcapacitive sensing signal different than the first transcapacitive sensing signal. Further, the first and second transcapacitive sensing signals may be based on different ones of a plurality of digital codes that enable the combined effects on the resulting signals of receiver electrodes to be independently determined.

In various embodiments, while a first one or more of the sensor electrodes 205 is driven with transcapacitive sensing signals, a second one or more sensor electrodes may be operated singly or multiply to acquire resulting signals.

The sensor driver 204 may be configured to operate the sensor electrodes 205 for absolute capacitive sensing and/or operate the sensor electrodes 205 for transcapacitive sensing as is described above. In one or more embodiments, the sensor driver 204 be configured to switch between operating the sensor electrodes 205 for absolute capacitive sensing and operating the sensor electrodes for transcapacitive sensing. Further, in various embodiments, the sensor driver 204 may be configured to selectively drive and receive with a portion of sensor electrodes 205. For example, the sensor electrodes utilized to perform absolute capacitive sensing and/or transcapacitive sensing may be selected based on, but not limited to, an application running on the host processor, a status of the input device, an operating mode of the sensing device and a determined location of an input device. The host processor may be a central processing unit or any other processor of an electronic device. In various embodiments, the sensor driver 204 may operate the same sensor electrodes for absolute capacitive sensing and transcapacitance sensing. In one or more embodiments, the sensor driver 204 operates different sensor electrodes for absolute capacitive sensing and transcapacitance sensing.

The sensor driver 204 may operate the sensor electrodes 205 for absolute capacitive sensing and/or transcapacitive sensing during a capacitive frame. For example, a capacitive frame may correspond to operating each sensor electrode 205 for absolute capacitive sensing. Alternatively, a capacitive frame may correspond to operating each sensor electrode 205 to transcapacitive sensing. In another embodiment, a capacitive frame may correspond to operating each sensor electrode 205 for absolute capacitive sensing and transcapacitive sensing.

In some embodiments, one or more of the sensor electrodes 205 includes one or more display electrodes used in updating the display of the display screen. In one or more embodiment, the display electrodes comprise one or more segments of a common voltage electrode, also referred to as a Vcom electrode, a source electrode, gate electrode, an anode electrode or cathode electrode, among others. These display electrodes may be disposed on an appropriate display screen substrate. For example, in display screens such as In Plane Switching (IPS) and Plane to Line Switching (PLS) OLED, the display electrodes may be disposed on a transparent substrate, e.g., a glass substrate, thin-film transistor (TFT) glass, or any other transparent material. In other embodiments, in display screens such as Patterned Vertical Alignment (PVA) and Multi-domain Vertical Alignment (MVA), the display electrodes may be disposed on the bottom of a color filter glass. In such embodiments, an electrode that is used as both a sensor electrode and a display electrode can also be referred to as a combination electrode, since it performs multiple functions.

Continuing to refer to FIG. 2, in various embodiments, the sensor driver 204 comprises sensing circuitry configured to drive the transcapacitive sensing signals and the absolute capacitive sensing signals onto the sensor electrodes 205 and receive resulting signals with the sensor electrodes 205 during periods in which input sensing is desired.

For example, in one or more embodiments, the sensor driver 204 comprises a transmitter circuitry configured to drive a transcapacitive sensing signal and/or an absolute capacitive sensing signal onto the sensor electrodes 205 during periods in which input sensing is desired.

Additionally, or alternatively, the sensor driver 204 comprises receiver circuitry configured to receive a resulting signal with one or more of the sensor electrodes 205 when operating the sensor electrodes 205 for transcapacitive sensing and/or absolute capacitive sensing. In one or more embodiments, the sensor module comprises a plurality of receivers, where each receiver may be an analog front ends (AFEs). Each receiver may be coupled to one or more the sensor electrodes 205, respectively.

In one or more embodiments, the sensor driver 204 determines a position of the input object in the sensing region 120 based on the received resulting signals. In one or more embodiments, the sensor driver 204 provides a signal including information indicative of the resulting signal to another module or processor such as a determination module of the processing system 110 or a processor of the electronic device, e.g., a host processor, for determining the positional information of the input object 140 in the sensing region 120. For example, in one embodiment, the sensor driver 204 may provide the signal indicative of the resulting signal to the determination module 206.

In embodiments where the sensor electrodes 205 are operated for absolute capacitive sensing, the determination module 206 determines changes in absolute capacitance for the sensor electrodes 205 based on resulting signals received by the sensor driver 204. In embodiments where the sensor electrodes 205 are operated for transcapacitive sensing, the determination module 206 determines changes in transcapacitance for the sensor electrodes 205 based on the resulting signals received by the sensor driver 204. The determination module 206 may process the resulting signals, or a signal based on the resulting signals, to determine one or more capacitive images from the changes in absolute capacitive sensing and/or transcapacitive sensing. Further, the determination module 206 may determine positional information for the input object 140 from the one or more capacitive images or from the changes in absolute capacitance and/or transcapacitance.

In one or more embodiments, the processing system 110 includes a display driver that includes display driver circuitry configured to drive display electrodes to update a display. The display driver may include source driver circuitry configured to drive source electrodes of a display device for display updating. The display driver may be included with or separate from the sensor driver 204. In one embodiment, the processing system comprises a first IC chip comprising the display driver and at least a portion of the sensor driver 204. In another embodiment, the processing system 110 comprises a first integrated controller comprising the display driver and a second integrated controller comprising at least a portion of the sensor driver 204.

In one or more embodiments, capacitive or input sensing and display updating may occur during at least partially overlapping periods. For example, as a display electrode is driven for display updating, the display electrode may also be driven for capacitive sensing. Alternatively, a sensor electrode 205 may be operated for transcapacitive sensing and/or absolute capacitive sensing while a display electrode is driven for display updating. Overlapping capacitive sensing and display updating periods may include modulating the reference voltage(s) of the display device and/or modulating one or more display electrode of a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. The sensor driver 204 may be configured to drive sensor electrodes for capacitive sensing during any one or more of or any combination of the different non-display update periods.

Figure 3:
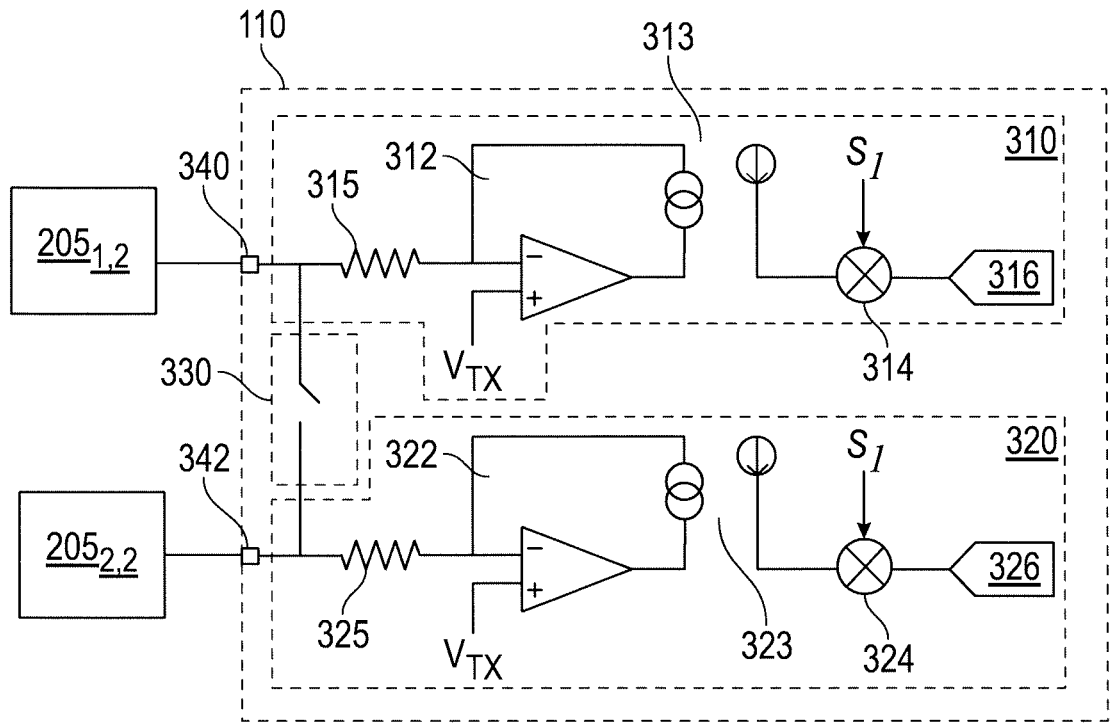
FIG. 3 is a schematic block diagram of a portion of a processing system, according to one or more embodiments.
Figure 4:
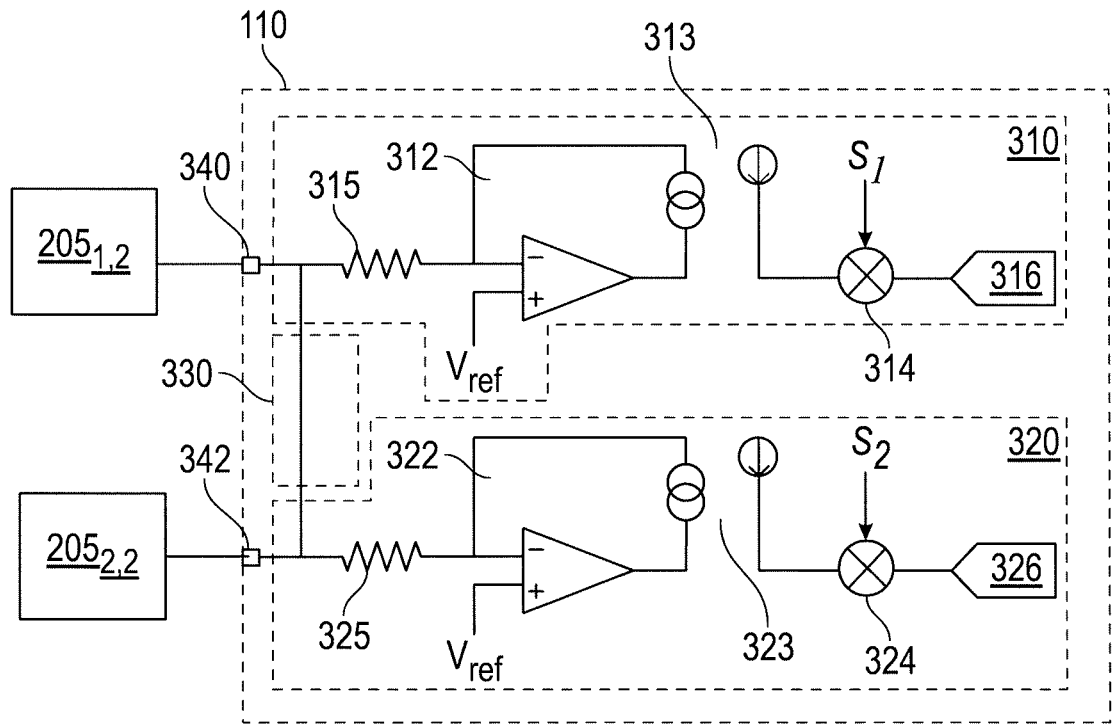
FIG. 4 is a schematic block diagram of a portion of a processing system, according to one or more embodiments.

FIGS. 3 and 4 illustrate a portion of the processing system 110 in two different modes of operation. For example, in FIG. 3 the processing system 110 is illustrated in a second mode where the receiver channels 310 and 320 are decoupled from each other. Further, in FIG. 4 the processing system 110 is illustrated as being in a first mode where the receiver channels 310 and 320 are coupled to each other.

FIG. 3 illustrates a portion of the processing system 110, according to one or more embodiments. Specifically, FIG. 3 illustrates receiver channels 310 and 320 and a switching mechanism 330. The switching mechanism 330 is coupled between the inputs of the receiver channel 310 and the receiver channel 320. While FIG. 3 illustrates a two receiver channels and one switching mechanism, in one or more embodiments, the processing system 110 may include more than two receiver channels and more than one switching mechanism. For example, the processing system 110 may include ten or more or one hundred or more receiver channels. Further, a respective switching mechanism is coupled to alternating pairs of receiver channels. For example, a first switching mechanism is coupled to a first and second receiver channels and a second switching mechanism is coupled to a third and fourth receiver channel.

The receiver channel 310 comprises an integrator 312, a mixer 314, a resistor 315 and an analog to digital converter (ADC) 316. In other embodiments, the receiver channel 310 may include other elements. For example, the receiver channel 310 may include one or more filters and sample and hold circuitry. The receiver channel 310 is coupled to the sensor electrode $205_{1,2}$ via input terminal 340 of the processing system 110.

The integrator 312 may include an amplifier and a current conveyor 313. In other embodiments, a feedback capacitor and a feedback reset switch or resistor may be included within the integrator 312 instead of the current conveyor 313. Further, the inverting input of the amplifier of the integrator 312 is coupled to a first end of the resistor 315. A second end of the resistor 315 is coupled to the input terminal 340. The resistance value of the resistor 315 may be in a range of about 100 ohms to about a 10 K-ohms. In one embodiment, the resistor 315, along with the capacitance of the associated sensor electrodes 205, suppress high frequency interference (e.g., GSM or the like). The non-inverting input of the amplifier of the integrator 312 is configured to be driven with a sensing signal ($V_{TX}$) to modulate the sensor electrode $205_{1,2}$. For example, in a second mode, the non-inverting input of the amplifier of the integrator 312 is driven with the sensing signal to modulate the sensor electrode $205_{1,2}$. Further, in the second mode, a resulting signal is received from the driven sensor electrode $205_{1,2}$ via the inverting input of the amplifier of the integrator 312.

The mixer 314 is coupled to the output of the integrator 312. In the second mode, the mixer 314 is configured to mix the output signal of the integrator 312 with a mixing signal $S_1$. The output of the mixer 314 is provided to the ADC 316. The frequency and/or phase of the mixing signal $S_1$ may be the same as the frequency and/or phase of the sensing signal ($V_{TX}$).

The receiver channel 320 comprises an integrator 322, a mixer 324, a resistor 325 and an ADC 326. In other embodiments, the receiver channel 320 may include other elements. For example, the receiver channel 320 may include one or more filters and sample and hold circuitry. The receiver channel 320 is coupled to the sensor electrode $205_{2,2}$ via input terminal 342 of the processing system 110.

The integrator 322 includes an amplifier and a current conveyor 313. In other embodiments, a feedback capacitor and a feedback reset switch or resistor may be included within the integrator 322 instead of the current conveyor 323. Further, the inverting input of the amplifier of the integrator 322 is coupled to a first end of the resistor 325. A second end of the resistor 325 is coupled to the input terminal 342. The resistance value of the resistor 325 may be in a range of about 100 ohms to about a 100 K-ohms. In one embodiment, the resistor 315 is configured to high frequency interference (e.g., GSM or the like). The non-inverting input of the amplifier of the integrator 322 is configured to be driven with a sensing signal ($V_{TX}$) to modulate the sensor electrode $205_{2,2}$. For example, in a second mode, the non-inverting input of the amplifier of the amplifier of the integrator 322 is driven with the sensing signal to modulate the sensor electrode $205_{2,2}$. Further, in the second mode, a resulting signal is received from the driven sensor electrode $205_{2,2}$ via the inverting input of the amplifier of the integrator 322.

The mixer 324 is coupled to the output of the integrator 322. In the second mode, the mixer 324 is configured to mix the output signal of the integrator 322 with the mixing signal $S_1$. The output of the mixer 324 is provided to the ADC 326.

The switching mechanism 330 is coupled to an input of the receiver channel 310 and the receiver channel 320. For example, the switching mechanism 330 is coupled to the receiver channel 310 between the input terminal 340 and the resistor 315 and to the receiver channel 320 between the input terminal 342 and the resistor 325. The switching mechanism 330 may include one or more switches. As illustrated, the switch of the switching mechanism 330 is open and decouples the receiver channel 310 from the receiver channel 320.

As is discussed above, FIG. 3 illustrates a second mode of the processing system 110. Further, as is discussed above, in the second mode, the switching mechanism 330 decouples the receiver channel 310 from the receiver channel 320. The second mode corresponds to an input sensing mode. For example, during the second mode, the sensor electrodes $205_{1,2}$ and $205_{2,2}$ are actively driven with the sensing signal to detect changes in absolute capacitance of each of the sensor electrodes $205_{1,2}$ and $205_{2,2}$.

FIG. 4 illustrates the processing system 110 in a first mode, according to one or more embodiments. The switching mechanism 330 couples the input of the receiver channel 310 with the input of the receiver channel 320 in response to the receiver channels 310 and 320 being in the first mode. Accordingly, a combined resulting signal including a resulting signal received from the sensor electrode $205_{1,2}$ and a resulting signal received from the sensor electrode $205_{2,2}$ which is divided between the receiver channels 310 and 320. The combined resulting signal includes a resulting signal received from the sensor electrode the sensor electrode $205_{1,2}$ and the resulting signal received from the sensor electrode $205_{2,2}$. The combined resulting signal includes a corresponding resulting signal received from two or more of the sensor electrodes 205. Alternatively, the combined resulting signal includes a corresponding resulting signal received from three or more of the sensor electrodes 205.

The resulting signal received by each receiver channel 310 and 320 corresponds to about half of the total charge on the sensor electrodes $205_{1,2}$ and $205_{2,2}$. The resulting signals received by each receiver channel 310 and 320 are the same and correspond to equal portions of the combined resulting signal. In other embodiments, the resulting signal received by each receiver channel 310 and 320 differ and correspond to different portions of the combined resulting signal. For example, the resulting signals received by each receiver channel 310 and 320 differ due to the difference in circuit characteristics between the receiver channels 310 and 320. The combined resulting signal corresponds to a combined charge on the sensor electrodes $205_{1,2}$ and $205_{2,2}$ and the charge may be divided between each receiver channel 310 and 320.

In the first mode, the non-inverting input of each amplifier of each integrator 312 and 322 is driven with a reference voltage, Vref. The reference voltage is a direct current voltage. For example, the reference voltage may be a ground voltage. In other embodiments, the reference voltage may be a DC voltage other than ground voltage. Additionally, in the first mode, the mixer 324 mixes the output of the integrator 322 with a mixing signal $S_2$. The mixing signal $S_2$ may have the same frequency as the sensing signal ($V_{TX}$). Additionally, the mixing signal $S_2$ differs in phase from the sensing signal ($V_{TX}$). Further, the phase of the mixing signal $S_2$ differs from the phase of the mixing signal $S_1$. For example, the mixing signal $S_2$ is orthogonal, e.g., ninety degrees out of phase, with the mixing signal $S_1$. Accordingly, the receiver channel 310 determines an in-phase component of the corresponding resulting signal and the receiver channel 320 determines a quadrature component of the corresponding resulting signal. As will be described in greater detail with regard to FIGS. 8A and 8B, the in-phase and quadrature components may be utilized by the determination module 206 to determine a measure of interference. The measure of interference may correspond to a measure of input object, e.g., the input object 140, coupled interference. Input object coupled interference correspond to interference that is coupled into the input device 100 when an input object is present within the sensing region, e.g., the sensing region 120. Further, in-phase component may be utilized to determine a measure of interference that is at the sensing signal frequency and the quadrature component may be utilized to determine a measure of interference that is ninety degrees out of phase with the sensing signal frequency.

Figure 5:
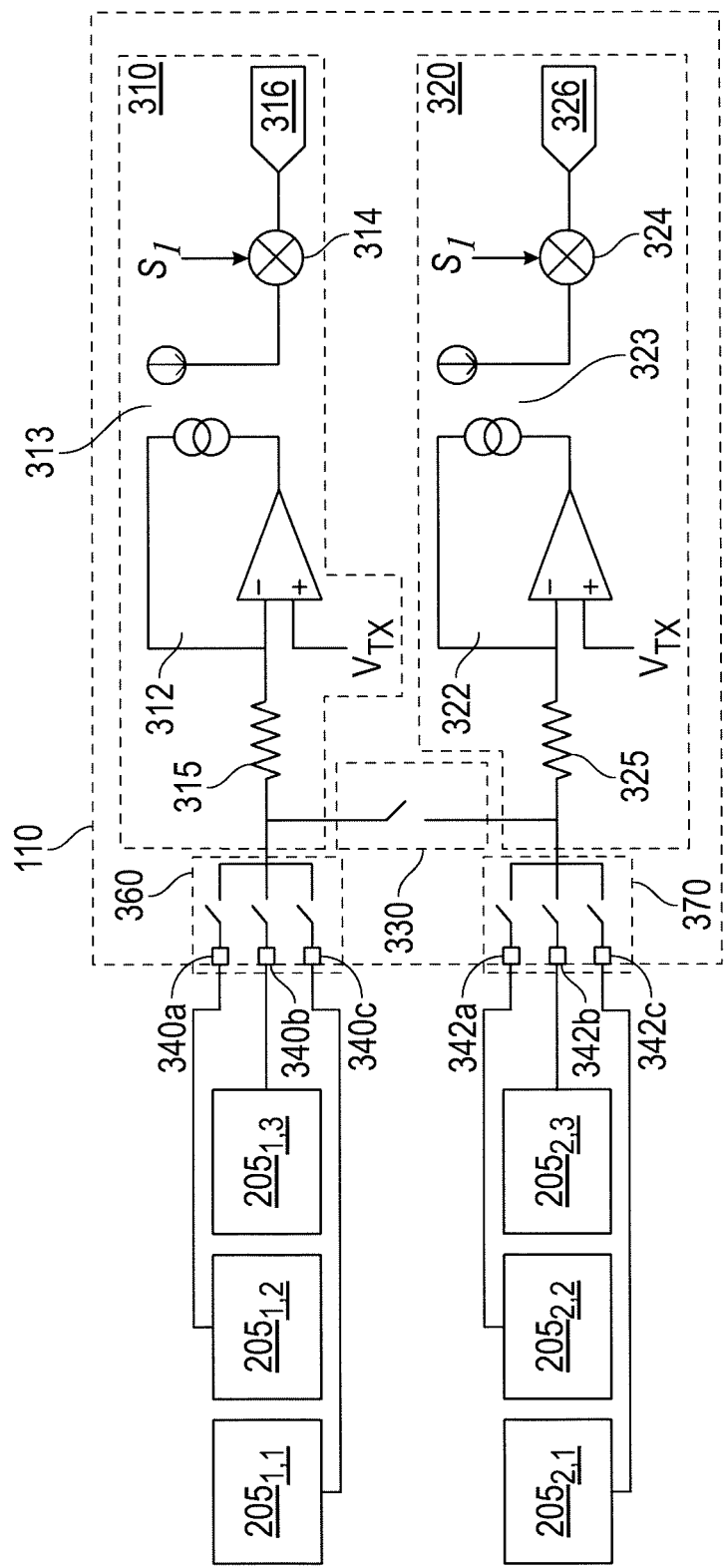
FIG. 5 is a schematic block diagram of a portion of a processing system, according to one or more embodiments.

FIG. 5 illustrates another embodiment of processing system 110. As compared to the embodiment of FIG. 3, in the embodiment of FIG. 5, each of the receiver channels 310 and 320 are coupled to two or more sensor electrodes via switching mechanisms 360 and 370, respectively. The switching mechanism 360 selectively couples the receiver channel 310 to the input terminals 340a, 340b, and 340c. The input terminals 340a, 340b, and 340c are coupled to sensor electrodes $205_{1,1}$, $205_{1,2}$, and $205_{1,3}$, respectively. Further, the switching mechanism 370 selectively couples the receiver channel 320 to the input terminals 342a, 342b, 342c. The input terminals 342a, 342b, and 342c are coupled to sensor electrodes $205_{2,1}$, $205_{2,2}$, and $205_{2,3}$, respectively. The switching mechanisms 360 and 370 may be comprised within the processing system 110. Alternatively, the switching mechanisms 360 and 370 may be external to the processing system 110. In such an embodiment, the receiver channels 310 and 320 are each coupled to one or more input terminals 340 and 342, respectively, and the input terminals 340 and 342 are coupled to the switching mechanisms 360 and 370, respectively. Additionally, the switching mechanisms 360 and 370 are coupled to the sensor electrodes 205 such that the switching mechanisms 360 and 370 are disposed between the sensor electrodes 205 and the input terminals 340, 342.

The switching mechanisms 360 and 370 may include one or more switches. In one embodiment, the number of switches of the switching mechanisms 360 and 370 is at least as large as the number of sensor electrodes 205 that each receiver channel 310, 320 is coupled. In various embodiments, the switching mechanisms 360 and 370 may include one or more multiplexers.

The switching mechanism 360 may couple the sensor electrodes $205_{1,1}$, $205_{1,2}$, and $205_{1,3}$ to the receiver channel 310 on a one at a time basis. Additionally, the switching mechanism 360 may couple two or more of the sensor electrodes $205_{1,1}$, $205_{1,2}$, and $205_{1,3}$, to the receiver channel 310 at the same time. Further, the switching mechanism 360 may couple each of the sensor electrodes $205_{1,1}$, $205_{1,2}$, and $205_{1,3}$, to the receiver channel 310 at the same time. For example, in the second mode, the switching mechanism 360 couples the sensor electrodes $205_{1,1}$, $205_{1,2}$, and $205_{1,3}$ to the receiver channel 310 on a one at a time basis. Further, during the first mode, the switching mechanism 360 couples the sensor electrodes $205_{1,1}$, $205_{1,2}$, and $205_{1,3}$ to the receiver channel 310 at the same time.

The switching mechanism 370 may couple the sensor electrodes $205_{2,1}$, $205_{2,2}$, and $205_{2,3}$ to the receiver channel 320 on a one at a time basis. Additionally, the switching mechanism 370 may couple two or more of the sensor electrodes $205_{2,1}$, $205_{2,2}$, and $205_{2,3}$ to the receiver channel 320 at the same time. Further, the switching mechanism 370 may couple each of the sensor electrodes $205_{2,1}$, $205_{2,2}$, and $205_{2,3}$, to the receiver channel 320 at the same time. For example, in the second mode, the switching mechanism 370 couples the sensor electrodes $205_{2,1}$, $205_{2,2}$, and $205_{2,3}$ to the receiver channel 310 on a one at a time basis. Further, during the first mode, the switching mechanism 370 couples the sensor electrodes $205_{2,1}$, $205_{2,2}$, and $205_{2,3}$ to the receiver channel 310 at the same time.

In the embodiment of FIG. 5, the sensor electrodes coupled to each receiver channel 310 and 320 may correspond to an orientation that is different than that illustrated in FIG. 5. For example, as each receiver channel is illustrated as being coupled to sensor electrodes of a common row, the receiver channels may be coupled to sensor electrodes in one or more rows and/or one or more columns. Further, the receiver channels may be coupled to one or more sensor electrodes that are not adjacent to each other.

Figure 6:
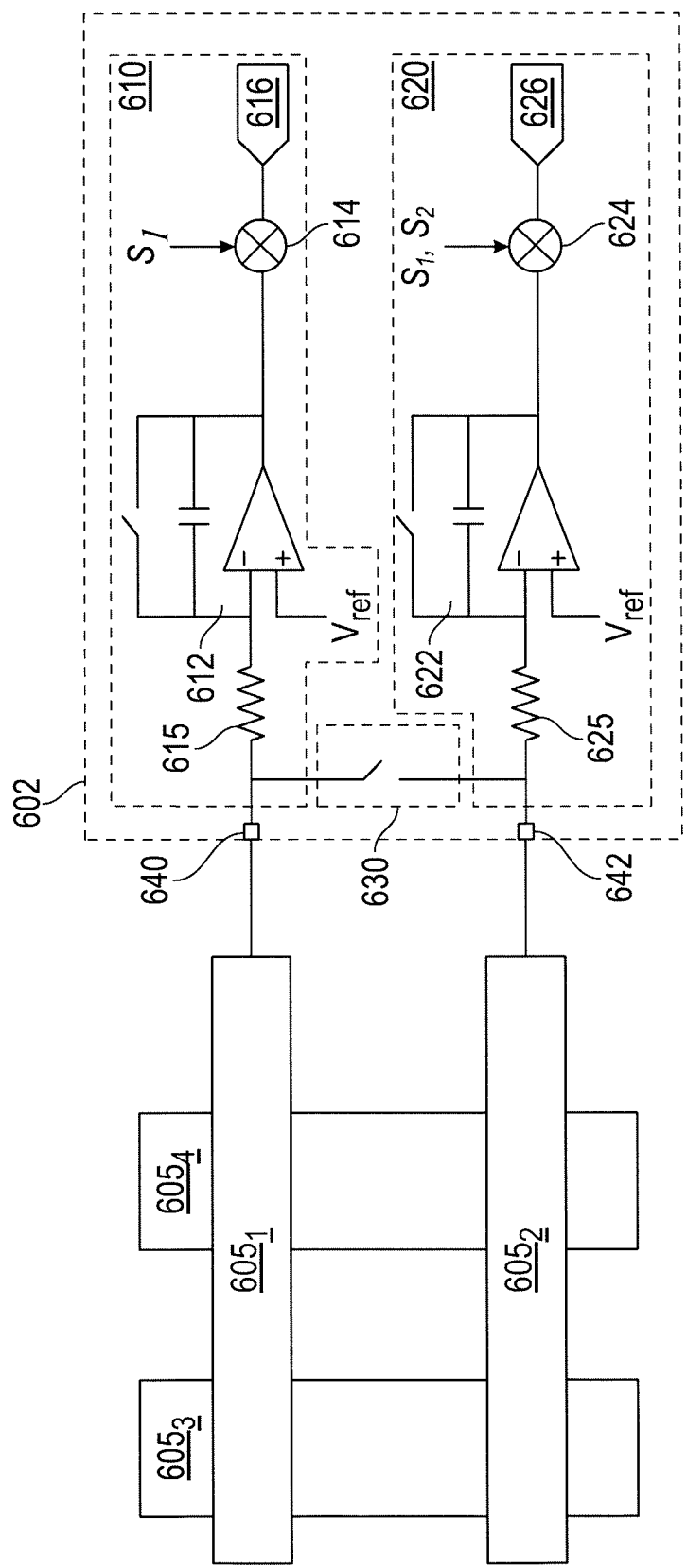
FIG. 6 is a schematic block diagram of a portion of a processing system, according to one or more embodiments.

FIG. 6 illustrates a processing system 602 coupled to sensor electrodes 605, according to one or more embodiments. The processing system 602 is configured similar to that of the processing system 110. For example, the processing system 602 is configured to operate the sensor electrodes 605 for capacitive sensing. Further, in one embodiment, the processing system 602 is configured to operate the sensor electrodes for transcapacitive sensing. For example, during a second mode, the receiver channels 610 and 620 may receive resulting signals from the sensor electrodes $605_1$ and $605_2$ which comprise effects corresponding to a transcapacitive sensing signal driven on the sensor electrodes $605_3$ and $605_4$.

The processing system 602 comprises a receiver channel 610, a receiver channel 620, and the switching mechanism 630. The receiver channel 610 and the receiver channel 620 are configured similar to that of the receiver channels 310 and 320 of FIG. 3. Further, the switching mechanism 630 couples the input of the receiver channel 610 with the input of the receiver channel 620.

The receiver channel 610 includes a resistor 615, an integrator 612, a mixer 614, and an ADC 616. Further, the receiver channel 610 may additionally include one or more filters and sample and hold circuitries, among others. The resistor 615 is configured similar to that of the resistor 315 and is coupled to the input terminal 640. The integrator 612 is coupled to the resistor 615. Further, the integrator 612 is illustrated as comprising a feedback capacitor and reset switch. However, in other embodiments, the integrator 612 may be configured similar to that of the integrator 312 such that the integrator 612 comprises a current conveyor (e.g., the current conveyor 313). The mixer 614 is coupled to the output of the integrator 612 and is configured to mix an output signal of the integrator 612 with a mixing signal having mixing signal $S_1$. In a first mode and second mode, the mixer 614 applies the mixing signal $S_1$. The frequency and/or phase of the mixing signal $S_1$ is the same as the frequency and/or phase of the sensing signal utilized for transcapacitive sensing. Accordingly, in the first mode and the second mode, the output signal of the mixer 614 is an in-band component of the corresponding resulting signal. The ADC 616 is coupled to the output of the mixer 614 and is configured to generate a digital output signal from the mixer output signal of the mixer 614.

The receiver channel 620 includes a resistor 625, an integrator 622, a mixer 624, and an ADC 626. Further, the receiver channel 620 may additionally include one or more filters and sample and hold circuitries, among others. The resistor 625 is configured similar to that of the resistor 325 and is coupled to the input terminal 642. The integrator 622 is coupled the resistor 625. Further, the integrator 622 is illustrated as comprising a feedback capacitor and reset switch. However, in other embodiments, the integrator 622 may be configured similar to that of the integrator 322 such that the integrator 622 comprises a current conveyor (e.g., the current conveyor 323). The mixer 624 is coupled to the output of the integrator 622 and is configured to mix an output signal of the integrator 622 with the mixing signal $S_1$ or with the mixing signal $S_2$. In a second mode, the mixer 624 applies the mixing signal $S_1$ and in a first mode the mixer 624 applies the mixing signal S$_2$ that is orthogonal in phase to the mixing signal S$_1$. Accordingly, in the second mode, the output signal of the mixer 624 is an in-band component of the corresponding resulting signal and in the first mode the output signal of the mixer 624 is a quadrature component of the corresponding resulting signal. The ADC 626 is coupled to the output of the mixer 624 and is configured to generate a digital output signal from the mixer output signal of the mixer 614.

The switching mechanism 630 is configured similar to that of the switching mechanism 330. For example, in a second mode, the switching mechanism decouples the receiver channel 610 from the receiver channel 620. In a first mode, the switching mechanism 630 couples the receiver channel 610 with the receiver channel 620. In the first mode, a combined resulting signal from the sensor electrodes 605$_1$ and 605$_2$ is output to the receiver channels 610 and 620. As is described with reference to FIG. 4, in the first mode, the portion of the combined resulting signal received by the receiver channel 610 and the portion of the combined resulting signal received by the receiver channel 620 may be the same or may differ from each other. For example, the portions of the combined resulting signals may differ based on the circuitry characteristics of the receiver channels 610 and 620.

Figure 7:
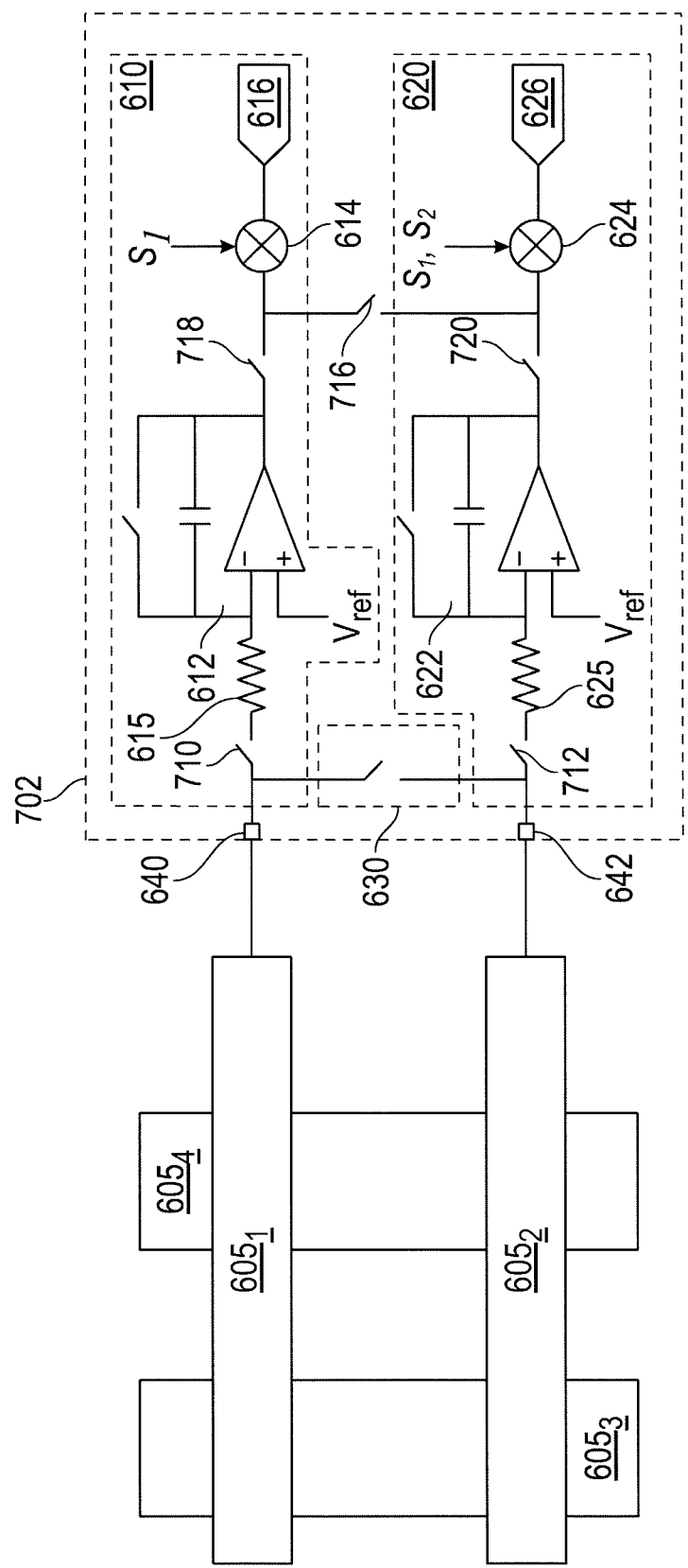
FIG. 7 is a schematic block diagram of a portion of a processing system, according to one or more embodiments.

FIG. 7 illustrates a portion of a processing system 702, according to one or more embodiments. The processing system 702 is configured similar to that of the processing system 110 and 602. The processing system 702 includes a receiver channel 610, a receiver channel 620 and the switching mechanism 630. Further, the processing system 702 includes a switch 710 at the input of the receiver channel 610, a switch 712 at the input to the receiver channel 620, and a switch 716 between the outputs of the integrators 612 and 622 and the inputs of the mixers 614 and 624. Additionally, the processing system 702 includes a switch 718 at the output of the integrator 612 and a switch 720 at the output of the integrator 622. input terminal.

In a first mode, a switch of the switching mechanism 630 is closed; coupling the receiver channel 610 with the receiver channel 620, and the switch 716 is closed. Further, the switch 710 is closed and the switch 712 is opened. Additionally, the switch 718 is closed and the switch 720 is opened. Accordingly, the integrator 622 may be bypassed such that the integrated signal received by the mixer 624 is provided by the integrator 612.

Further, in the first mode, the mixer 614 applies the mixing signal S$_1$ to the integrated signal output by the integrator 612, and the mixer 624 applies the mixing signal S$_2$ having a phase that is orthogonal to the phase of the mixing signal S$_1$. Additionally, in the first mode, the integrated signal provided to the mixers 614 and 624 is the same.

In a second mode, the switch of the switching mechanism 630 is opened; decoupling the receiver channel 610 from the receiver channel 620, and the switch 716 is opened. Further, the switches 710 and 712 are closed such that the input of the receiver channels 610 and 620 are coupled to input terminals 640 and 642, respectively. Additionally, the switches 718 and 720 are closed. Further, the mixer 614 and the mixer 624 apply the mixing signal S$_1$ to the output signal of the integrators 612 and 622, respectively.

In one or more embodiments, the processing system 110 of FIG. 3 may be replaced by the processing system 602 or 710.

Figure 8:
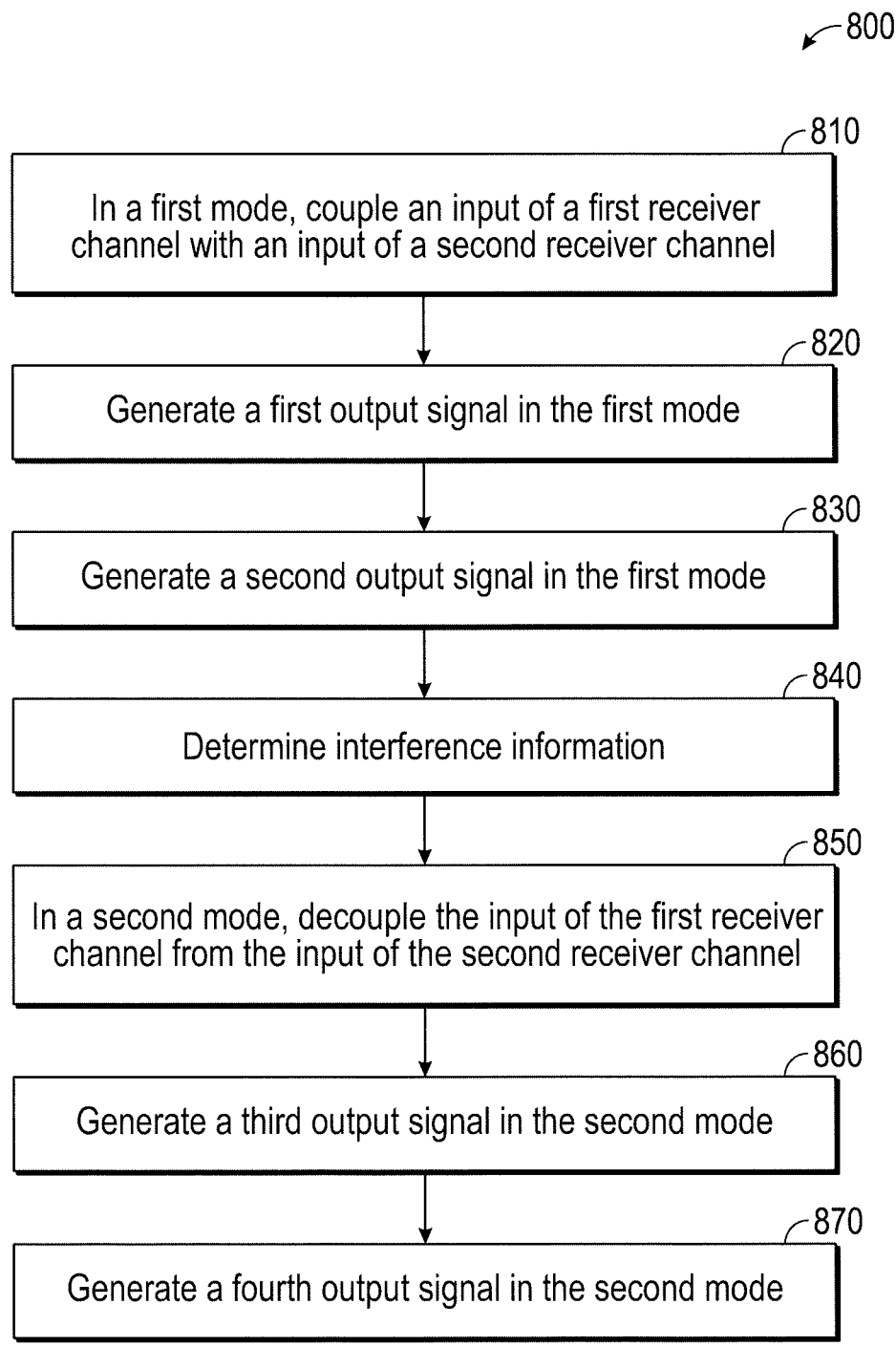
FIG. 8 is a flowchart illustrating a method for operating a sensing device, according to one or more embodiments.

FIG. 8 is a flowchart of a method 800 for performing capacitive sensing, according to one or more embodiments. At operation 810, in a first mode, an input of a first receiver channel is coupled to an input of a second receiver channel. For example, with reference to FIG. 4, the switching mechanism 330 is closed and couples the input of the receiver channel 310 to the input of the receiver channel 320. Accordingly, the resulting signals from the sensor electrodes 205$_{1,2}$ and 205$_{2,2}$ are combined into a combined resulting signal. In other embodiments, as illustrated in FIG. 5, the combined resulting signal is received from the sensor electrodes 205$_{1,1}$, 205$_{1,2}$, 205$_{1,3}$, 205$_{2,1}$, 205$_{2,2}$, and 205$_{2,3}$. A portion of the combined resulting signal is received by each receiver channel 310 and 320. In one embodiment, the portions of the combined resulting signal received by each receiver channel 310 and 320 are the same. Alternatively, the portions of the combined resulting signal received by each receiver channel 310 and 320 may be different. For example, the portions of the combined resulting signal received by each receiver channel 310 and 320 may differ based on the circuit characteristics of each receiver channel 310 and 320. For example, in one embodiment, the receiver channel 310 may receive a larger portion of the combined resulting signal than the receiver channel 320. In another embodiment, the receiver channel 320 may receive a larger portion of the combined resulting signal than the receiver channel 310. Further, as each receiver channel 310 and 320 receive different portions of the combined resulting signal, the amount of charge corresponding to the sensor electrode 205$_{1,2}$ and 205$_{2,2}$ received by each receiver channels 310 and 320 differs.

In the first mode, the sensor electrodes 205 are driven with a reference signal such that the corresponding resulting signals comprise effects corresponding to interference. The interference may be coupled into the sensor electrodes 205 via the input object 140. Driving the sensor electrodes 205$_{1,2}$ and 205$_{2,2}$ with a reference signal may include driving the non-inverting terminals of the integrators 312 and 322 with the reference signal, e.g., Vref.

At operation 820, a first output signal is generated while receiver channels of a processing system are in the first mode. For example, the receiver channel 310 generates the first output signal by mixing a first portion of the combined resulting signal with the mixing signal S$_1$. Mixing the first portion of the combined resulting signal with the mixing signal S$_1$ having the same phase and/or frequency as the sensing signal (V$_{TX}$) generates an in-band component of the first portion of the combined resulting signal. Further, the first output signal may be generated by the mixer 314. For example, in one embodiment, the integrator 312 generates a first integrated signal from the first portion of the combined resulting signal. The mixer 314 mixes the first integrated signal with the mixing signal S$_1$ to generate the first output signal.

At operation 830, a second output signal is generated while receiver channels of a processing system are in the second mode. For example, the receiver channel 320 generates the second output signal by mixing a second portion of the combined resulting signal with the mixing signal S$_2$. The phase of the mixing S$_2$ is orthogonal to the phase of the mixing signal S$_1$. Mixing the second portion of the combined resulting signal with the mixing signal S$_2$ generates a quadrature component of the combined resulting signal. Further, the second output signal may be generated by the mixer 324. For example, the integrator 322 generates a second integrated signal from the second portion of the combined resulting signal. The mixer 324 mixes the second integrated signal with the mixing signal S$_2$ to generate the second output signal.

At operation 840, interference information is determined. The determination module 206 determines a measurement of interference based on at least one of the first output signal and the second output signal. In one embodiment, the determination module 206 determines a measurement of interference based on the first output signal or the second output signal. In another embodiment, the determination module 206 determines a measurement of interference based on the first output signal and the second output signal. The determination module 206 receives the first output signal of the receiver channel 310 and the second output signal of the receiver channel 320. The first and second output signals may be processed by an ADC of each respective receiver channel before being communicated to the determination module 206. The determination module 206 determines a magnitude of the in-phase component of the combined resulting signal based on the first output signal and a magnitude of the quadrature component of the combined resulting signal based on the second output signal. The magnitude of the in-phase component may correspond to a magnitude of interference at the mixing signal $S_1$ and the magnitude of the quadrature component may correspond to a magnitude of the interference at the mixing signal $S_2$. In one embodiment, the mixing signal $S_1$ and the mixing signal 52 are ninety degrees out of phase with each other. Further, the mixing signal $S_1$ is similar in phase and frequency with a sensing signal (e.g., the sensing signal $V_{TX}$) driven on the sensor electrodes to perform absolute capacitive sensor or transcapacitive sensing. Accordingly, the magnitude of the in-phase component corresponds to the magnitude of interference at the sensing signal and the magnitude of the quadrature component corresponds to the magnitude of interference ninety degrees out of phase with the sensing signal.

The determination module 206 may alter the sensing signal utilized to perform capacitive sensing (e.g., absolute capacitive sensing or transcapacitive sensing). For example, the determination module 206 may provide an indication to alter the sensing signal utilized for to perform absolute capacitive sensing based on the measurement of the in-phase component and/or the quadrature component. Altering the sensing signal utilized for capacitive sensing comprising shifting from driving the sensor electrodes with a sensing signal having a first frequency to a sensing signal having a second frequency different than the first frequency.

In one embodiment, the determination module 206 compares the magnitude of the in-phase component and/or the quadrature component to an interference threshold to determine if either exceeds the interference threshold. In response to determining that magnitude of the in-band component and/or the magnitude of the quadrature component exceeds the interference threshold, the determination module 206 provides an indication to the sensor driver 204 to shift to a sensing signal having a different frequency.

At operation 850 while in a second mode, an input of a first receiver channel is decoupled from an input of a second receiver channel. For example, with reference to FIG. 3, a switch of the switching mechanism 330 is opened, decoupling the input of the receiver channel 310 from the input of the receiver channel 320.

At operation 860, a third output signal is generated. For example, with reference to FIG. 3, a third output signal is generated by the receiver channel 310 by mixing a third resulting signal with the mixing signal $S_1$. The third resulting signal is received from the sensor electrode $205_{1,2}$. To receive the third resulting signal, the sensor electrode $205_{1,2}$ is driven with a sensing signal. For example, the receiver channel 310 may modulate the sensor electrode $205_{1,2}$ with an absolute capacitive sensing signal and receive a first resulting signal from the sensor electrode $205_{1,2}$. Modulating the sensor electrode $205_{1,2}$ may include modulating the non-inverting input of the integrator 312 of the receiver channel 310. Alternatively, one or more sensor electrodes 205 may be driven with a transcapacitive sensing signal while the receiver channel 310 receives a third resulting signal from the sensor electrode $205_{1,2}$.

The receiver channel 310 includes the integrator 312 that integrates the third resulting signal to generate an integrated signal. Further, the mixer 314 mixes the integrated signal with the mixing signal $S_1$ to generate the third output signal.

At operation 870, a fourth output signal is generated. For example, with reference to FIG. 3, a fourth output signal is generated by the receiver channel 320 by mixing a fourth resulting signal with the mixing signal $S_1$. The fourth resulting signal is received from the sensor electrode $205_{2,2}$. To receive the third resulting signal, the sensor electrode $205_{2,2}$ is driven with a sensing signal. For example, the receiver channel 320 may modulate the sensor electrode $205_{2,2}$ with an absolute capacitive sensing signal and receive a first resulting signal from the sensor electrode $205_{2,2}$. Modulating the sensor electrode $205_{2,2}$ may include modulating the non-inverting input of the integrator 322 of the receiver channel 320. Alternatively, one or more sensor electrodes 205 may be driven with a transcapacitive sensing signal while the receiver channel 320 receives a fourth resulting signal from the sensor electrode $205_{2,2}$.

The receiver channel 320 includes the integrator 322 that integrates the fourth resulting signal to generate an integrated signal. Further, the mixer 324 mixes the integrated signal with the mixing signal $S_1$ to generate the fourth output signal.

In one or more embodiments, the determination module 206 may determine positional information based on the third output signal and the fourth output signal. The third and fourth output signals may be processed by the ADC of each respective receiver channel before being transmitted to the determination module 206. The determination module 206 baselines the third and fourth signals to generate corresponding baselined signals. The determination module 206 determines measurements of a change in capacitance for each of the sensor electrodes $205_{1,2}$ and $205_{2,2}$ from the baselined signals. Further, the determination module 206 compares the measurements of changes in capacitance to one or more thresholds to determine the positional information for the input object (e.g., the input object 140).

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A processing system comprising:
   a sensor driver configured to drive a first receiver channel and a second receiver channel with a reference signal in a first mode;

the first receiver channel configured to:
  generate, in the first mode, a first output signal by mixing a first portion of a combined resulting signal with a first mixing signal having a first phase, wherein the combined resulting signal includes a first resulting signal received from a first sensor electrode and a second resulting signal received from a second sensor electrode;
the second receiver channel configured to:
  generate, in the first mode, a second output signal by mixing a second portion of the combined resulting signal with a second mixing signal having a second phase orthogonal to the first phase; and
a switching mechanism coupled to an input of the first receiver channel and an input of the second receiver channel, the switching mechanism configured to:
  couple the input of the first receiver channel with the input of the second receiver channel in response to the first receiver channel and second receiver channel being in the first mode; and
  decouple the input of the first receiver channel from the input of the second receiver channel in response to the first receiver channel and second receiver channel being in a second mode,
wherein the sensor driver is configured to drive the first receiver channel and the second receiver channel with a sensing signal in the second mode, the sensing signal being different from the reference signal.

2. The processing system of claim 1, wherein the first receiver channel and the second receiver channel are configured to simultaneously generate the first output signal and the second output signal.

3. The processing system of claim 1 further comprising:
a determination module configured to determine a measurement of interference based on at least one of the first output signal and the second output signal.

4. The processing system of claim 1, wherein the first receiver channel while in the second mode is further configured to generate a third output signal by mixing a third resulting signal with the first mixing signal, the third resulting signal received from the first sensor electrode, and the second receiver channel while in the second mode is further configured to generate a fourth output signal by mixing a fourth resulting signal with the first mixing signal, the fourth resulting signal received from the second sensor electrode.

5. The processing system of claim 4, further comprising:
a determination module configured to determine positional information for an input object based on at least one of the third output signal and the fourth output signal.

6. The processing system of claim 1, wherein the first receiver channel comprises:
a first resistor coupled to a first input terminal of the processing system;
a first integrator having an input coupled to the first resistor and configured to integrate the first portion of the combined resulting signal; and
a first mixer coupled to an output of the first integrator and configured to generate the first output signal,
wherein the second receiver channel comprises:
a second resistor coupled to a second input terminal of the processing system;
a second integrator having an input coupled to the second resistor and configured to integrate the second portion of the combined resulting signal; and
a second mixer coupled to an output of the second integrator and configured to generate the second output signal, and
wherein the switching mechanism is coupled to the input of the first receiver channel between the first input terminal and the first resistor and to the input of the second receiver channel between the second input terminal and the second resistor.

7. The processing system of claim 1, wherein the first portion of the combined resulting signal is larger than the second portion of the combined resulting signal or the second portion of the combined resulting signal is larger than the first portion of the combined resulting signal.

8. An input device comprising:
a plurality of sensor electrodes comprising a first sensor electrode and a second sensor electrode; and
a processing system coupled to the plurality of sensor electrodes, the processing system comprising:
  a sensor driver configured to drive a first receiver channel and a second receiver channel with a reference signal in a first mode;
  the first receiver channel configured to:
    generate, while in the first mode, a first output signal by mixing a first portion of a combined resulting signal with a first mixing signal having a first phase, wherein the combined resulting signal includes a first resulting signal received from the first sensor electrode and a second resulting signal received from the second sensor electrode;
  the second receiver channel configured to:
    generate, while in the first mode, a second output signal by mixing a second portion of the combined resulting signal with a second mixing signal having a second phase orthogonal to the first phase; and
  a first switching mechanism coupled to an input of the first receiver channel and an input of the second receiver channel, the first switching mechanism configured to:
    couple the input of the first receiver channel with the input of the second receiver channel in response to the first receiver channel and second receiver channel being in the first mode; and
    decouple the input of the first receiver channel from the input of the second receiver channel in response to the first receiver channel and second receiver channel being in a second mode,
  wherein the sensor driver is configured to drive the first receiver channel and the second receiver channel with a sensing signal in the second mode, the sensing signal being different from the reference signal.

9. The input device of claim 8, wherein the first receiver channel and the second receiver channel are configured to simultaneously generate the first output signal and the second output signal.

10. The input device of claim 9 wherein the processing system is configured to determine a measurement of interference based on at least one of the first output signal and the second output signal.

11. The input device of claim 8, wherein the first receiver channel while in the second mode is further configured to generate a third output signal by mixing a third resulting signal with the first mixing signal, the third resulting signal received from the first sensor electrode, and the second receiver channel while in the second mode is further configured to generate a fourth output signal by mixing a fourth resulting signal with the first mixing signal, the fourth resulting signal received from the second sensor electrode.

12. The input device of claim 11, wherein the processing system is configured to determine positional information for an input object based on at least one of the third output signal and the fourth output signal.

13. The input device of claim 8, wherein the first receiver channel comprises:
a first resistor coupled to a first input terminal of the processing system;
a first integrator having an input coupled to the first resistor, the first integrator configured to integrate the first portion of the combined resulting signal; and
a first mixer coupled to an output of the first integrator, the first mixer configured to generate the first output signal, wherein the second receiver channel comprises:
a second resistor coupled to a second input terminal of the processing system;
a second integrator having an input coupled to the second resistor, the second integrator configured to integrate the second portion of the combined resulting signal; and
a second mixer coupled to an output of the second integrator, the second mixer configured to generate the second output signal, and
wherein the first switching mechanism is coupled to the input of the first receiver channel between the first input terminal and the first resistor and to the input of the second receiver channel between the second input terminal and the second resistor.

14. The input device of claim 8, wherein the processing system further comprising a second switching mechanism coupled between input terminals of the processing system and the input of the first receiver channel, the second switching mechanism configured to couple the input terminals with the input of the first receiver channel in response to the first receiver channel being in the first mode.

15. The input device of claim 8, wherein the first portion of the combined resulting signal is larger than the second portion of the combined resulting signal, or the second portion of the combined resulting signal is larger than the first portion of the combined resulting signal.

16. A method of capacitive sensing, the method comprising:
coupling, in a first mode, an input of a first receiver channel with an input of a second receiver channel;
driving, in the first mode, the first receiver channel and the second receiver channel with a reference signal;
generating, by the first receiver channel and while in the first mode, a first output signal by mixing a first portion of a combined resulting signal with a first mixing signal having a first phase, wherein the combined resulting signal includes a first resulting signal received from a first sensor electrode and a second resulting signal received from a second sensor electrode;
generating, by the second receiver channel and while in the first mode, a second output signal by mixing a second portion of the combined resulting signal with a second mixing signal having a second phase orthogonal to the first mixing signal;
decoupling, in a second mode, the input of the first receiver channel from the input of the second receiver channel; and
driving, in the second mode, the first receiver channel and the second receiver channel with a sensing signal, the sensing signal being different from the reference signal.

17. The method of claim 16, wherein the first output signal and the second output signal are simultaneously generated.

18. The method of claim 16 further comprising:
determining a measurement of interference based on at least one of the first output signal and the second output signal.

19. The method of claim 16 further comprising:
generating, by the first receiver channel while in the second mode, a third output signal by mixing a third resulting signal with the first mixing signal, wherein the third resulting signal is received from the first sensor electrode;
generating, by the second receiver channel while in the second mode, a fourth output signal by mixing a fourth resulting signal with the first mixing signal, wherein the fourth resulting signal is received from the second sensor electrode; and
determining positional information for an input object based on at least one of the third output signal and the fourth output signal.

20. The method of claim 16, wherein the first portion of the combined resulting signal is larger than the second portion of the combined resulting signal or the second portion of the combined resulting signal is larger than the first portion of the combined resulting signal.

* * * * *